United States Patent [19]

Hara et al.

[11] Patent Number: 4,818,847
[45] Date of Patent: Apr. 4, 1989

[54] APPARATUS FOR OPTICALLY READING PRINTED INFORMATION

[75] Inventors: Masahiro Hara, Kariya; Atutoshi Okamoto, Chita; Toshiyasu Sakai, Kariya; Tadao Oshima, Obu; Hiroshi Yamamoto, Anjo; Hiromitsu Takai, Obu, all of Japan

[73] Assignee: Nippondenso Co., Ltd., Kariya, Japan

[21] Appl. No.: 517,745

[22] Filed: Jul. 27, 1983

[30] Foreign Application Priority Data

Jul. 29, 1982 [JP] Japan ................................ 57-132818
Aug. 19, 1982 [JP] Japan ................................ 57-144273

[51] Int. Cl.$^4$ .............................................. G06K 7/10
[52] U.S. Cl. ...................................... 235/455; 235/462; 235/472; 235/465; 250/566; 250/553
[58] Field of Search ............... 235/454, 462, 463, 468, 235/469, 465, 462, 455, 472; 382/59, 65; 250/566, 568, 553

[56] References Cited

U.S. PATENT DOCUMENTS

| | | | |
|---|---|---|---|
| 3,684,868 | 8/1972 | Christie et al. | 235/465 |
| 3,911,270 | 10/1975 | Traub | 235/472 X |
| 4,101,784 | 7/1978 | Key et al. | 235/454 X |
| 4,210,802 | 7/1980 | Sakai | |
| 4,315,245 | 2/1982 | Nakahara et al. | 235/472 X |
| 4,408,120 | 10/1983 | Hara et al. | 235/454 X |
| 4,440,248 | 4/1984 | Teraoka | 235/462 X |

FOREIGN PATENT DOCUMENTS

| | | |
|---|---|---|
| 2307283 | 11/1976 | France . |
| 53-15210 | 4/1978 | Japan . |
| 53-76047 | 7/1978 | Japan . |
| 54-12229 | 1/1979 | Japan . |
| 55-70168 | 5/1980 | Japan . |
| 55-97668 | 7/1980 | Japan . |
| 56-33770 | 4/1981 | Japan . |

Primary Examiner—David L. Trafton
Attorney, Agent, or Firm—Cushman, Darby & Cushman

[57] ABSTRACT

Apparatus for optically reading printed information by radiating light onto printed information to be reflected thereby, receiving the reflected light through an optical system and converting the image of the reflected light into a corresponding electric signal. The light source employs red light emitting diodes which radiate highly bright red light having a wavelength peak at about 660 nm so that the image sensor can receive a highly contrasting reflected light from the information printed in black on a white base. The light source further or alternatively employs infrared light emitting diodes for radiating the light having a peak wavelength at about 925 nm so that the image sensor can also received a highly contrasting reflected light from information printed in black on a blue or green base.

6 Claims, 3 Drawing Sheets

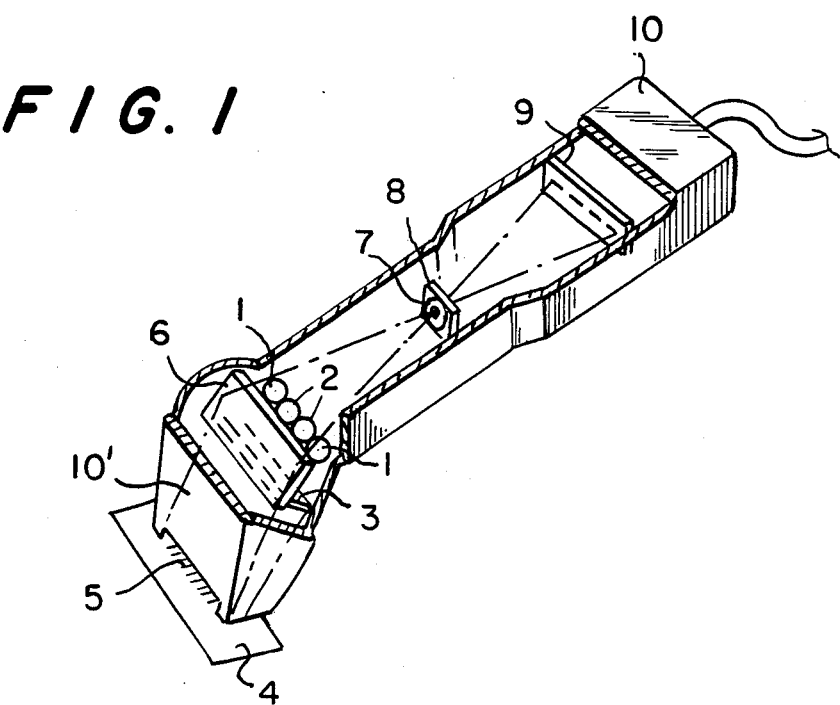
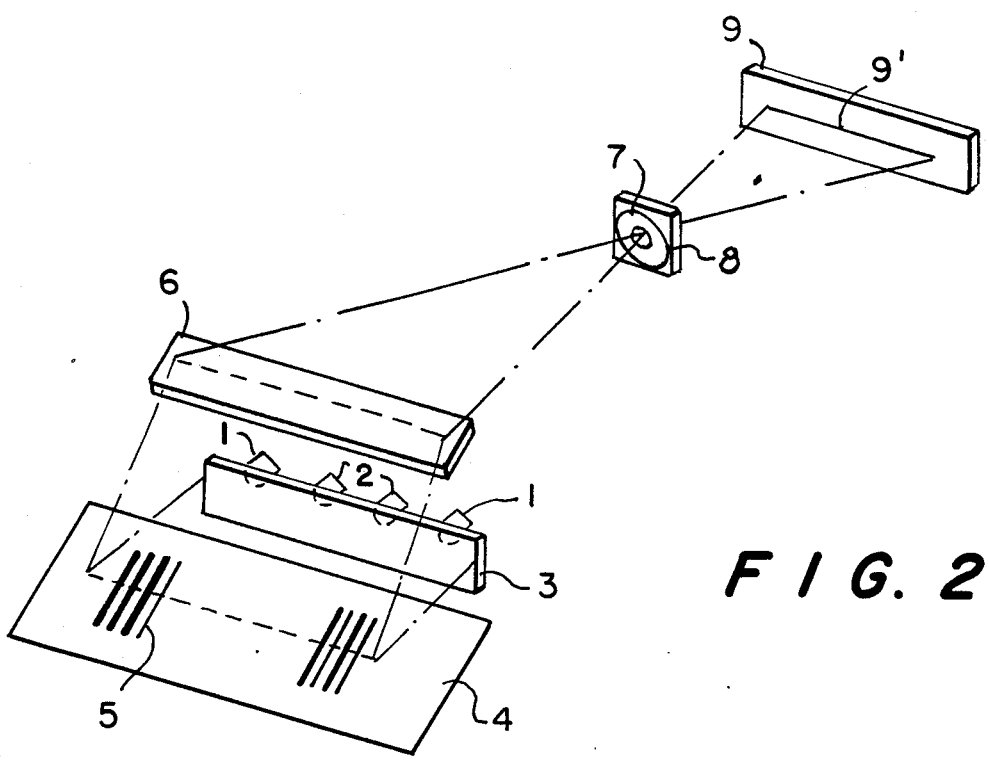

APPARATUS FOR OPTICALLY READING PRINTED INFORMATION

BACKGROUND OF THE INVENTION

The present invention relates to apparatus for optically reading printed information such as bar codes, letter or numerical characters or the like printed on a base such as a label or the like.

In a conventional reading apparatus of this kind such as disclosed in Japanese laid-open patent application No. 56-33770 published Apr. 4, 1981, a tungsten bulb has been used to radiate the light onto information such as bar codes, numerical or letter characters or the like printed on a white base so that reflected light corresponding to the printed information is provided, and an electronically scanned image sensor has been used to convert the information image of the reflected light into a corresponding electric signal.

When the information is printed in black using black ink on a white base, the reflected light is very contrasting because of high and low light reflectivities of the white portion and the black portion, respectively, over a whole range of wavelengths of the illuminating light from a tungsten bulb. Thus, no disability in information reading arises.

However, when the information is printed in black using a thermal printer on a heat sensitive white base, the reflected light becomes less contrasting as the wavelength of the illuminating light becomes longer because of the increased light reflectivity of the black portion in the longer wavelengths of the light. Since the illuminating light from a tungsten bulb has many infrared light wavelengths which are longer than the wavelengths of visible light, the reflected light is not contrasting enough to be read and an information reading disability is encountered.

For this reason, an infrared light filter which cuts off the infrared wavelength component has usually been provided to lower the light sensitivity in the infrared light wavelength range in view of the fact that the image sensor has a high light sensitivity in the range of the infrared light wavelengths.

However, even if an infrared light cut-off filter is used, the cut-off characteristic of the filter is not nullified in the range of the visible light wavelengths in spite of the considerable decrease in the wavelength range from the near infrared light to the visible light. Therefore, the light radiation intensity of a tungsten bulb must be increased to compensate for the decrease in the spectral sensitivity due to the filter operation. This results in a large-sized light source and an increase in the generated heat issuing from the light source.

SUMMARY OF THE INVENTION

It is a primary object of the present invention to provide reading apparatus which can read information printed either by black ink on a white base or a thermal printer on a heat sensitive white base without using an infrared light cut-off filter.

It is a further object of the present invention to provide reading apparatus which can read information printed by ink on a colored base.

The optical reading apparatus according to the present invention includes a light source for radiating the light to a printed information to be reflected thereby, and an image sensor for receiving the reflected light through an optical system and converting the image of the reflected light into a corresponding electric signal. In one embodiment, the light source includes red light emitting diodes which radiate highly bright red light having a wavelength at about 660 nm (nanometers) so that the image sensor can receive a highly contrasting reflected light from information printed by black ink or a thermal printer on a white base.

The light source further, or alternatively, employs other light emitting diodes such as infrared light emitting diodes for radiating the light having a light wavelength at about 925 nm so that the image sensor receives highly contrasting light reflected from information printed in black on either a blue or green base.

BRIEF DESCRIPTION OF THE DRAWINGS

In the accompanying drawings:

FIG. 1 is a partially schematic view of a first embodiment of the present invention with parts broken away;

FIG. 2 is an enlarged schematic view of the major portion of the first embodiment shown in FIG. 1;

DETAILED DESCRIPTION OF THE PREFERRED EMBODIMENTS

Figure 3:
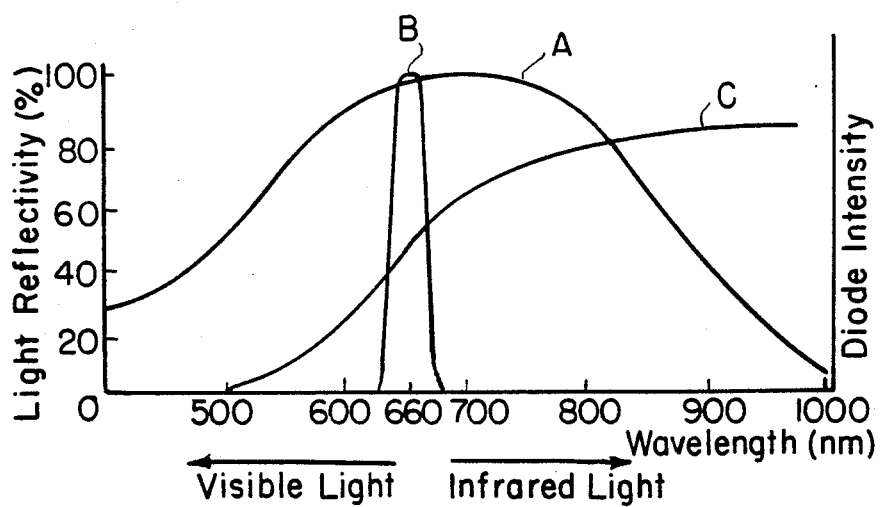
FIG. 3 is a characteristic chart used in describing the first embodiment shown in FIG. 1.

The present invention is now described in greater detail with reference to the accompanying drawings.

In FIGS. 1 and 2, numeral 1 designates a pair of serially-connected red light emitting diodes which have a light radiation spectrum peak at about 660 nm (nanometers) to radiate highly bright red light having a wavelength of about 660 nm. The diodes 1 are connected in series with a resistor (not shown) which determines the light brightness. Numeral 2 designates another pair of serially-connected red light emitting diodes positioned between the pair of the light emitting diodes 1 and connected in parallel therewith. The light emitting diodes 2 which have the same light radiation characteristic as diodes 1 are connected in series with a resistor (not shown) having a slightly larger resistance value to decrease slightly the light brightness thereof relative to that of the light emitting diodes 1. The diodes 1 and 2 may be a planar type which planarly radiate the red light. The use of light emitting diodes 1 and 2 with high brightness is effective to decrease the heat generated by the light source. Although two diodes 1 and two diodes 2 are preferable, it is to be understood that either more or less of each may be employed as desired or needed in any given situation. In fact, with appropriate lens arrangements and/or with some types of diodes it may not be necessary to use any central diode with decreased light output.

A light diffuser 3 is positioned in front of the diodes 1 and 2 to diffuse and equalize the illumination light irradiated to a white label 4 on which information to be read is printed.

The information printed on the label 4 is a conventional type bar code 5 which comprises a combination of white bars and black bars. Starting with a white base for label 4, the black bars may be printed thereon conventionally either by black ink or by a thermal printer (if the label is heat sensitive) which turns the label black where the heat is applied. As shown in FIG. 2, bar code 5 provides various pieces of information by variations of the widths of the white bars and the black bars.

Numeral 6 designates a planar reflex mirror which reflects and changes the direction of the reflected light from the bar code 5 toward a light condensing lens 7 and an iris member 8.

An image sensor 9, which may be a conventional silicon semiconductor type, is positioned behind the iris member 8 to receive the reflected light passing through the lens 7 and the iris member 8 onto the sensor's reading line 9' at which a number of photo elements (not shown) are aligned to have a one-dimensional resolution. The image sensor 9 may be a planar type which has a two-dimensional resolution. The image sensor 9 generally has a spectral sensitivity peak in the range of 650 through 900 nm.

A hand-carried case 10 made of light shielding material encases the above-described optical system and has an open head 10' which faces the label 4 so that the illuminating red light to the bar code 5 and the reflected light from the bar code 5 pass therethrough. Although not shown, a light shielding member may be provided in the case 10 to prevent the illuminating light from the diodes 1 and 2 from being received by the image sensor 9 directly or though the reflex mirror 6, the lens 7 and the iris member 8.

The above-described reading apparatus is connected to a conventional data processing unit, not shown, through signal cables which transfer electric signals for electronically scanning the image sensor 9 and transfer electric signals produced by the image sensor 9.

The operation of the above embodiment is described next. The apparatus is first hand-carried to the label 4 as shown in FIG. 1 to encompass the bar code 5 transversely, and the red light emitting diodes 1 and 2 are all energized to radiate highly bright red light. The red light is irradiated to the bar code 5 through the light diffuser 3 and the open head 10' so that the light is reflected by the bar code 5. As a result of the light reflection, the transverse image of the bar code reflection is formed, through the planar reflex mirror 6, the lens 7 and the iris member 8, at the reading line 9' of the image sensor 9. Since the light reflectivity of the black bars and the white bars printed on the label 4 differs from each other, the bar code reflection image formed on the image sensor 9 has a light density distribution which corresponds to the bar code 5.

The photo elements of the image sensor 9 are preferably scanned one by one by the above-mentioned data processing unit (not shown) to convert the reflected image to an electric signal the successive amplitudes of which correspond to the successive light densities of the reflected light representing the color of the bars and the time durations of which correspond to the widths of the reflected light representing the widths of the bars of the bar code 5.

It is to be noted that the information reading capability of the apparatus is dependent on the arithmetic product of the spectral sensitivity of the image sensor and the contrast of the reflected light which can be a difference in light reflectivities of the black bar and the white bar. The use of the light emitting diodes 1 and 2 which radiate red light is advantageous in enhancing the information reading capability as described next.

In FIG. 3, curve A illustrates the spectral sensitivity characteristic of the image sensor 9, curve B illustrates the wavelength distribution characteristic of the red light from the diodes 1 and 2, and curve C illustrates the light reflectivity characteristic of black bars printed by a thermal printer.

As an example in FIG. 3, the spectral sensitivity characteristic of the image sensor 9 is shown by curve A to have a peak value at 700 nm, and the light radiation spectrum distribution of the light emitting diodes 1 and 2 is shown by curve B to reside in the range of about 660±30 nm with a peak value at about 660 nm. The light radiation spectrum distribution of the diodes 1 and 2 may vary in the range of 660±60 nm depending on the diodes used.

With respect to the light reflectivity of a black bar printed by the heat sensitive printer, curve C shows it at about 83% (PCS (printer contrast standard value)=0.02) relative to light having a wavelength of 900 nm, at about 53% (PCS=0.37) relative to light having a wavelength of 660 nm and at about 8% (PCS=0.89) relative to light having a wavelength of 550 nm. Here, the printer contrast standard value is defined as follows:

$$PCS = \frac{\text{light reflectivity of white bar} - \text{light reflectivity of black bar}}{\text{light reflectivity of white bar}}$$

Thus, the light reflectivity of a thermally printed black bar becomes higher as the wavelength becomes longer, and conversely its light reflectivity becomes lower as the wavelength approaches that of visible light. The light reflectivity of a white bar is higher than 70%. Therefore, it will be understood that light having a shorter wavelength is more desirable to provide a more contrasting reflected light.

However, since the peak value of the spectral sensitivity characteristic of the silicon semiconductor type image sensor 9 is generally in the range from 650 nm to 900 nm, the spectral sensitivity of the image sensor 9 is more degraded as the illuminating light irradiated to the bar code 5 has the shorter wavelength. The spectral sensitivity of the image sensor 9, for example is degraded to the range between 80% and 90% at the wavelength 600 nm. For this reason, it will be understood that light emitting diodes 1 and 2 having a light radiation spectrum peak at about 660 nm should be used as the light source of the reading apparatus in view of both the light reflectivity of the thermally printed black bar and the spectral sensitivity characteristic of the image sensor 9.

It is quite clear from FIG. 3 that light emitting diodes 1 and 2 having a light radiation spectrum peak at about 660 nm are also effective for reading the bar code 5 which is printed by the black ink on a white label 4, since the light reflectivity of the black bar is substantially 0% relative to that of the white bar, 70% to 100%.

With respect to the lengths of the light path between the bar code 5 and the reading line 9' of the image sensor 9 at which the reflection image of the bar code 5 is formed, the length of the reflection path starting from the end portions of the bar code 5 is longer than that starting from the central portion of the same. However, the bar code reflection image formed on the image sensor 9 is more equalized in brightness over the whole range in this embodiment, because the light radiation intensity of the outside light emitting diodes 1 which mainly irradiate the outside portion of the bar code 5 is kept slightly higher, due to the above-mentioned differential resistances, than that of the inside light emitting diodes 2 which mainly irradiate the inside portion of the bar code 5. Thus, the amplitude of the electric signal produced from the image sensor 9 is stabilized; hence, the succeeding signal processing is simplified, and highly accurate information reading is enabled.

Figure 4:
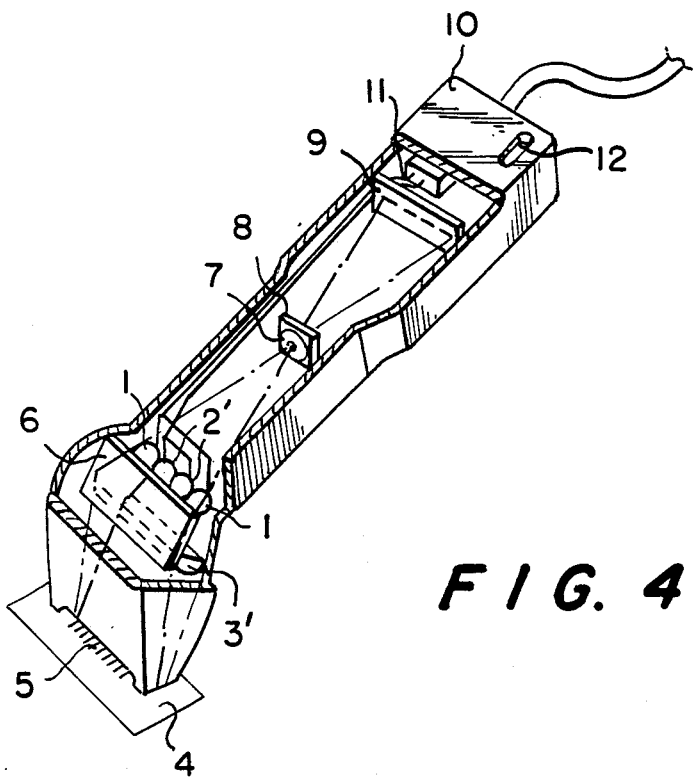
FIG. 4 is a partially schematic view of the second embodiment of the present invention with parts broken away.

Reference is next made to FIG. 4 in which a second embodiment is illustrated and the same reference numerals are used to designate the same or similar components as in the first embodiment.

In the second embodiment, a pair of infrared light emitting diodes 2' having a light radiation spectrum peak at about 925 nm are arranged between a pair of the red light emitting diodes 1 and connected in parallel therewith. The infrared light emitting diodes 2' radiate infrared light which has the wavelength in the range of 925±30 nm. A rectangular-shaped condensing lens 3' is positioned in front of the diodes 1 and 2' to converge and equalize the illuminating light radiated by diodes 1 and 2' onto bar code 5 printed on label 4. Bar code 5 may be printed in black by black ink on a white, green or blue label 4 or by a thermal printer on a heat sensitive white label 4. A switching circuit 11 connected to the diodes 1 and 2' is positioned in the tail end of the hand-carried case 10, and a manually-operated on-off switch 12 is provided on the tail end surface of case 10.

Figure 6:
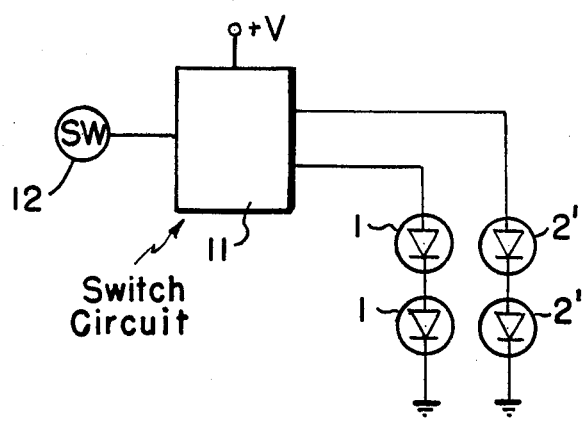
FIG. 6 is an electric wiring diagram of a portion of the second embodiment shown in FIG. 4.
Figure 7:
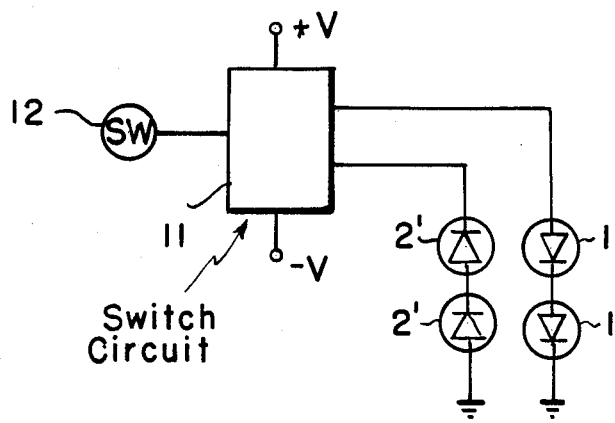
FIG. 7 is an electric wiring diagram of a modification of the diagram shown in FIG. 6.

As shown in FIG. 6, the switching circuit 11 is connected to switch 12 and to diodes 1 and 2' so that the switching circuit 11 energizes either pair of diodes 1 or 2' by a power supply +V in accordance with the position of switch 12. However, as shown in FIG. 7, the diode pairs may be oppositely oriented and switching circuit 11 may be designed to energize one of the diode pairs 1 and 2' by power sources +V and −V, respectively, in accordance with the position of the switch 12.

Figure 5:
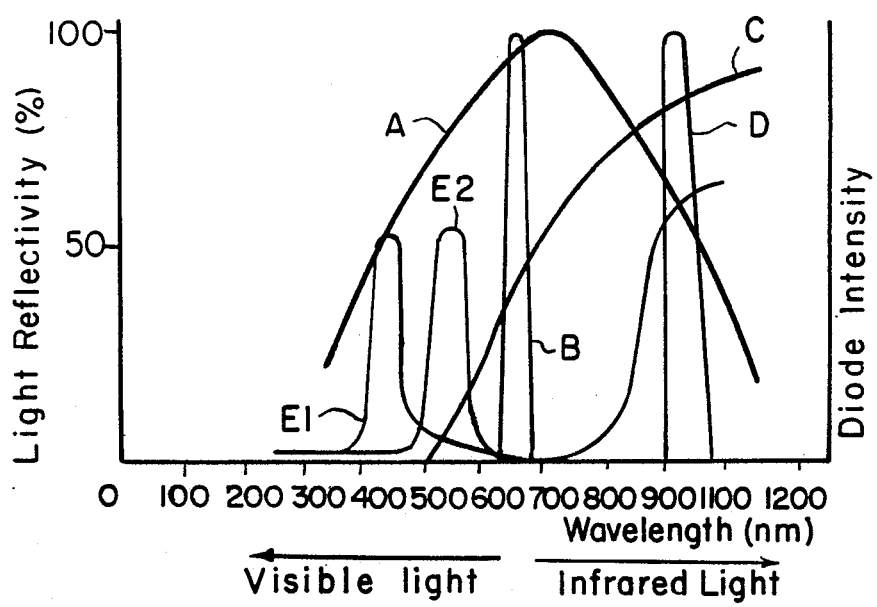
FIG. 5 is a characteristic chart used in describing the second embodiment shown in FIG. 4.

FIG. 5 illustrates a curve D indicative of the wavelength distribution characteristic of the infrared light emitting diodes 2' and curves E1 and E2 indicative of the light reflectivity characteristics of blue and green labels 4, respectively, in addition to curves A, B and C which are also shown in FIG. 3.

When it is desired to read a bar code 5 which is printed by black ink or by a thermal printer on a white label 4, only the red light emitting diodes 1 are energized by the switching circuit 11 and the switch 12 so that only red light without substantially any infrared light wavelength may be irradiated onto the bar code 5 through the illuminating lens 3'. In this instance, substantially the same reading operation can be performed as in the first embodiment and, therefore, no further description is necessary.

On the other hand, when the black bars of bar code 5 are printed by black ink on a blue or green label, to read the bar code 5, the position of the switch 12 is manually changed to cause switching circuit 11 to energize only the infrared light emitting diodes 2'. These diodes 2' radiate infrared light onto bar code 5 through the condensing lens 3'. Since the light reflectivities of the blue bars and the green bars are high at the infrared wavelength of about 925 nm as illustrated by curves E1 and E2 in FIG. 5, respectively, relative to that of the black bar the light reflectivity of which is substantially 0%, a sufficiently contrasting reflection image of the bar code 5 is formed on the image sensor 9 when the reflected light is received at the reading line 9' of the image sensor 9 through the planar reflex mirror 6, the condensing lens 7 and the iris member 8. Therefore, the bar code reflection image can be converted into an electric signal by the electronically scanned reading operation of the image sensor 9.

It is to be noted in the second embodiment that, even if both light emitting diodes 1 and 2' are energized concurrently, reading the bar code information is still possible, through the information reading capability of the apparatus may show some slight degradation or some difficulty in discriminating between black and white if the black bars are thermally printed since curve C crosses curve D so high up. In this case, the switching circuit 11 and switch 12 may be eliminated, or a position added to energize both diode pairs concurrently which may be especially useful in those instances where successive bar codes being read may variously have white or blue or green backgrounds.

It is to be noted further that the second embodiment may be modified to use other light emitting diodes in dependence on the colors of the printed information and label. For instance, green light emitting diodes which radiate highly bright green light having a wavelength at about 550 nm may be used to read information printed by black or red ink on a green label and orange light emitting diodes which radiate highly bright orange light having a wavelength at about 600 nm maybe used to read information printed by black or red ink on a yellow label.

The present invention having been described in detail is not limited thereto, but is limited only by the scope of the following claims since the described embodiments may be modified without departing from the spirit of this invention as defined below.

What is claimed is:

1. Apparatus for optically reading thermally printed information in the form of a combination of black and white bars formed on a thermally sensitive white base by thermal printing comprising:

a hand-carried case having an opening at one end thereof;

a light source provided in said case and including first and second pairs of red light emitting diodes in a row for radiating only red light at a wavelength of around 660 nanometers to said thermally printed information through said opening to be reflected thereby;

said second pair of diodes being disposed in between said first pair of diodes;

image forming means provided in said case for forming, at a predetermined position, a reflection image of said printed information in the reflected light received through said opening;

sensor means of silcon type provided in said case and having a spectral sensitivity peak of about 700 nanometers and being disposed at said predetermined position for converting said reflection image of said printed information into a corresponding electric signal, and means for causing said second pair of diodes to radiate red light with a lower brightness than the brightness radiated by the first pair of diodes to radiate side portions of said printed information at a higher intensity than a central portion thereof for compensating for different length reflection paths from said side and central portions to said image sensing means to effect more uniformity of reflected light across said image sensor means.

2. Apparatus as set forth in claim 1 further comprising:
light diffuser means positioned in front of said first and second light emitting diode means for diffusing said red light so that the red light radiated to said thermally printed information is more equalized.

3. Apparatus for optically reading information printed thermally on a thermally sensitive white base to form a combination of white bars and black bars, comprising:
a hand-carried housing provided with an opening at front end thereof;
a plurality of light sources arranged near said opening in said case for radiating only red light through said opening, said light sources including diodes having a light radiation spectrum peak only at about 660 nanometers;
image forming means arranged behind said light source in said case for forming, at a predetermined position, a reflection image of said printed information in the light reflected by said printed information and received through said opening; and
silicon sensor means provided behind said image forming means in said case and having a spectral sensitivity peak of about 700 nanometers at said predetermined position in said case for converting said reflection image of said printed information into a corresponding electric signal;
said light sources radiating said red light at different predetermined brightness onto said printed information through said housing opening to illuminate the outer portions of said printed information more brightly than a central portion thereof for compensating for different length reflection paths from said outer and central portions to said sensor means to effect greater uniformity of reflected light across said sensor means.

4. Apparatus as set forth in claim 3 further comprising:
a light diffuser arranged between said single light source and said opening in said housing for diffusing said red lights so that the red light radiated to said printed information is more equalized.

5. Apparatus for optically reading bar code information printed in the form of a combination of black and white bars arranged in parallel, said apparatus comprising:
a hand-carried housing having an opening adapted to encompass said bar code information transversely;
a plurality of light emitting diodes provided in said housing in the vicinity of the opening for emitting only red light at a wavelength of around 660 nanometers, said light emitting diodes being arranged in line to radiate the red light to said bar code information through said opening more intensely at the side portions of the bar code information than at the central portion of the same;
image forming means including a lens provided in said housing for forming a reflection image of said bar code information in the light reflected by said bar code information and received through said opening; and
an image sensor provided behind said image forming means in said housing and having a high spectral sensitivity at around wavelength of red light from said diodes for converting said reflection image of said bar code information into a corresponding electrical signal, whereby the amplitude of the electric signal corresponding to the reflected light travelling respective different light path lengths from said side and central portions to said sensor is stabilized by more intensively illuminating the side portions of the bar code information.

6. Apparatus according to claim 5, wherein said image forming means includes:
a planar reflex mirror positioned in the vicinity of the opening of said housing for directing the light reflected by said bar code information toward said image sensor.

* * * * *